Oct. 9, 1962 A. L. SMITH 3,057,291
MICROSCOPIC SLIDE MARKER
Filed May 3, 1960 2 Sheets-Sheet 2
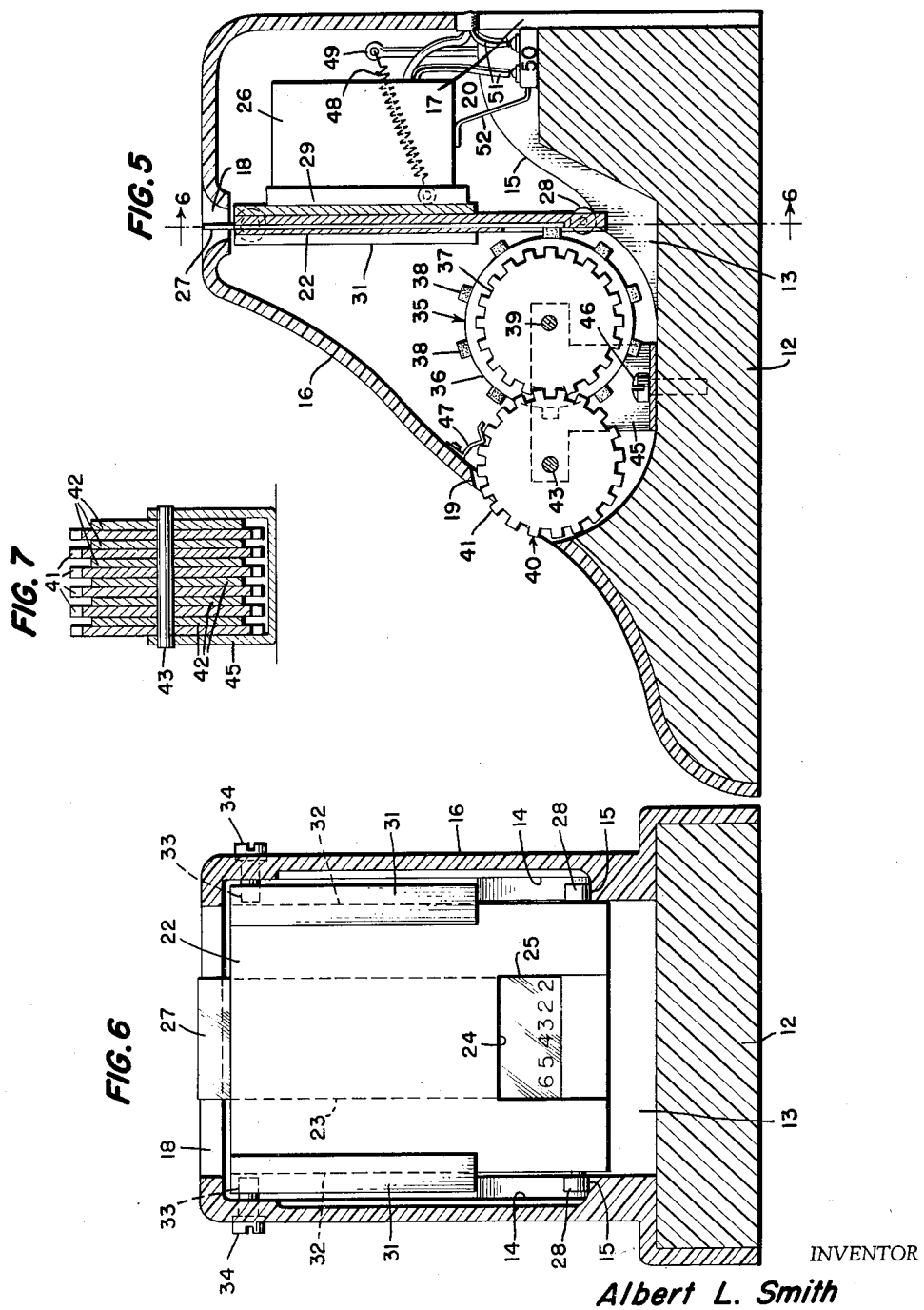
INVENTOR
Albert L. Smith
BY W. Glenn Jones
ATTORNEY

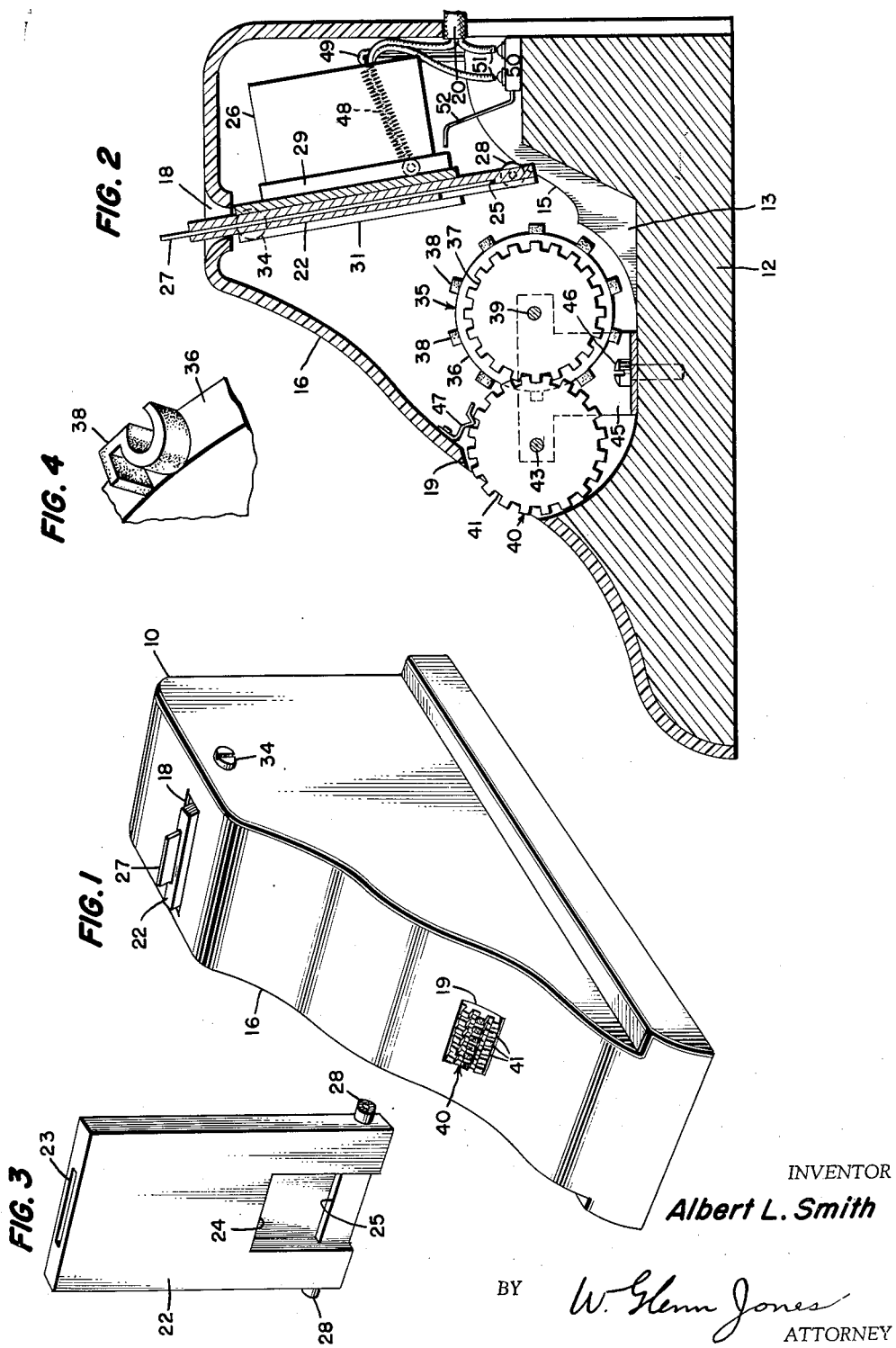

United States Patent Office 3,057,291
Patented Oct. 9, 1962

3,057,291
MICROSCOPIC SLIDE MARKER
Albert L. Smith, 6727 Fairfax Road, Apt. 21, Bethesda, Md.
Filed May 3, 1960, Ser. No. 26,661
5 Claims. (Cl. 101—4)
(Granted under Title 35, U.S. Code (1952), sec. 266)

The invention described herein may be manufactured and used by or for the Government of the United States of America for governmental purposes without the payment of any royalties thereon or therefor.

This invention relates generally to apparatus that may be used in conjunction with microscopes and relates particularly to a microscopic slide marker.

In the processing of microscope slides through a large biological or medical laboratory, the positive identification of such slides is practically mandatory. In microscopic work, the material to be examined is usually first placed, spread, or smeared upon a thin clear slide made of glass or other transparent material. Before the actual examination can be made, the material on the slide may require fixing and perhaps also staining. Since the fixing and staining procedures usually involve liquid treatments, obviously, ordinary methods of marking and identification using inks, pigments, or adhesive papers or tapes are not successfully accomplished. Some positive system of marking or identification is required to withstand the treatments and extensive handling undergone by such microscope slides during the necessary laboratory procedures.

A more positive identification procedure is found in the use of manually operated diamond-pointed abrading tools or by certain etching procedures utilizing acids or blasts of abrasive particles. Such procedures are slow and costly in man-hours as well as in materials. The principal disadvantage found in the manual application of the diamond pointed stylus is the poor legibility of the file number or other identifying data being engraved into the slide. Marking a numeral on a piece of smooth glass is none too easy. Slips of the diamond are made more often than not and many slides are wasted because of such slipping. Further, legibility may well be a function of the manual dexterity and writing ability of the operator. The file numbers or other indicia must be legible and easily identifiable to avoid mistakes which, in turn, might ruin an investigation where many slides were being used or be detrimental to the health and well-being of a medical patient. Another disadvantage of the manual methods may be found in the excessive handling of the slides required thereby. Such excessive handling would tend to soil the slides with oil or perspiration from the fingers as well as possibly disturb the specimen and its fixing or staining.

In the system of marking or identification hereinafter described, a six digit file number will be used. The first four digits, starting with 0000, will be used to designate the number of the slide. The last two digits will be used to indicate the year. Thus, 002160 would designate the 21st slide to be processed in 1960.

With the foregoing in view, the principal object of the invention, therefore, is to provide a means of rapidly, economically, and positively identifying the transparent microscope slides.

Another object of the invention is to provide an instrument that can be employed to abrade the identifying indicia into the surface of the microscope slides whereby the marking is legible and cannot be disturbed by the further processing of the slide through the customary laboratory procedures.

Other objects and many of the attendant advantages of this invention will be readily appreciated as the same becomes better understood by reference to the following detailed description when considered in connection with the accompanying drawings wherein:

FIGURE 1 is a perspective view of the invention;
FIG. 2 is a cross-sectional side elevation showing the parts in one operative position;
FIG. 3 is a perspective view of one of the elements;
FIG. 4 is a perspective view of another element;
FIG. 5 is a cross-sectional side elevation, similar to FIG. 2, showing the parts in another operative position;
FIG. 6 is a partly cross-sectional end elevation of the invention taken on the line 6—6 of FIG. 5; and
FIG. 7 illustrates another group of elements of the invention.

With reference to FIGS. 1, 2, and 3, this microscope slide marker 10 comprises a heavy, comparatively massive base 12 and an overall enveloping cover 16. The base 12, which may be made of metal to afford maximum stability is provided with a hollow or clearance portion 13 in its upper portion. While the shape of this hollow or clearance portion 13 is not critical, it should be sufficiently large to supply clearance for the moving parts and yet not so large as to unnecessarily detract from the weight of the base. The cover 16 may be made of plastic or other light material and is designed for easy removal from the base for servicing of the interior parts. This cover 16 is provided with fairly light sectional top, front, and back walls but has comparatively massive side walls. The interior surface of each cover side wall is reamed out as at 14 to provide a lower cammed portion 15.

This cover 16 is provided with three openings 17, 18, and 19. Opening 17, which may be a vertical slot, is provided for the insertion of the electrical cable 20 which supplies electrical current to the vibrator 26. Opening 18 is provided in the top of the cover for the insertion of the slide rack 22. Opening 19 is provided in the front sloping portion of the cover for the inspection and positioning of the front numbered gear wheels 41.

Slide rack 22 may be molded of plastic or other suitable material. It is furnished with a slot 23, dimensioned to accept a standard sized slide. The lower portion of the slot 23 is opened out into an apertured section 24 which is provided with an abutment 25. Thus, as the slide 27 is inserted into the slot in the slide rack, the lower end of the slide rests against the abutment 25 and is thus held exposed to the abrading action which follows as will be more fully described later. The slot 23 may be made of different sizes to accommodate a range of certain sizes of microscope slides. Thus, various slide racks 22 may be provided for use in the same marker instrument; each slide rack having the same external dimensions but having different slot sizes. Slide rack 22 is fitted with cam rollers 28 on its lower external vertical edges for the purpose to be set forth hereinafter.

Vibrator 26, which may be similar to any well known type of vibrators such as those incorporated in hand type vibrator-massagers, is provided with a base 29. The forwardly extending base portions 31 are provided with internal slots 32. The internal slots 32 are dimensioned to slidingly accept the slide racks 22. Externally, the upper portions of the base portions 31 are provided with pivot holes 33 formed to accept the smooth ends of pivot screws 34 which, as shown in FIG. 6, are threadedly inserted through the top portions of the side walls of the cover 16. Thus the vibrator 26 and its base 29 are pivotally mounted in the cover 16 for limited rotation around the axis defined by the pivot screws 34 and slide rack 22 is slidably mounted in vibrator base 29.

A light spring 48 extends from the lower portion of the base 29 to a suitable spring standard 49 which may be secured to the upper back portions of the cammed portions 15. While only one spring is shown, two springs on each side of the base are usually employed. The purpose of these springs 48 obviously is to rotate the vibrator base 29 counter clockwise about its pivot screws 34 and to urge the slot-held slide rack 22 up the cammed side walls 15 and away from the abrading wheels 36.

The intermeshed abrading and numeral or file character indicating mechanism will now be described with reference to FIGS. 2, 4, 6, and 7. The abrading portion 35 comprises an assembly of larger discs 36 and smaller diameter tooth gears 37. Affixed to the periphery of the larger disc 36 are abrasive numerals 38. These numerals may be molded or formed from a suitable abrasive material adapted to scratch or engrave glass or whatever transparent substance is used for the microscope slides and are secured to the periphery of the disc by cement, clips, or pins (not shown) as may be desired. The mode of attachment should be such that the numerals may be easily replaced when worn. In the embodiment illustrated, ten numerals are provided from 0 to 9 and the gear wheels have 20 teeth. Thus, a numeral is placed alongside every other tooth and the numeral disc is then secured to its corresponding gear wheel. This abrading assembly is then mounted on shaft 39 with each set of numeral disc and geared wheel free to rotate with respect to any other similar set.

The indicating portion 40 comprises an assembly of larger diameter gear wheels 41 alternating with smaller diameter smooth periphery spacer discs 42. This alternating assembly is rotatably secured to the shaft 43. The gear wheels 41 must have the same number of teeth as the abrading portion gear wheels 37. The periphery of every other gear tooth on gear wheel 41 is engraved or provided with a numeral from 0 to 9, inclusive. Usually, these numbers on both abrading and indicating wheels are arranged consecutively.

Shafts 39 and 43 are then mounted parallel to each other and the bottom of the base 12 in the bracket 45. This bracket may be secured to the base by a number of screws 46, two usually being sufficient. Obviously, when the assemblies are mounted in the bracket 45, the gear wheels must be meshed so that when, say, abrasive numeral 5 is horizontal to the base and positioned so as to make contact with the lower end of the slide, as shown in FIG. 5, the figure or numeral 5 on the corresponding indicating gear wheel 41 must be centrally disposed with relation to the cover opening 19. As is now apparent, this opening 19 should preferably only be wide enough in the vertical direction as to expose only one complete horizontal line of numerals. A light spring detent 47, secured to the inner front side of cover 16, may be provided for each indicating gear wheel as shown in FIG. 2. This spring indent would prevent the indicating and abrading wheels from inadvertently turning.

In connection with the vibrator 26, electric power is supplied thereto by means of cable 20, normally open switch 50 and leads 51. A contact arm 52 is provided in conjunction with switch 50.

When the marker is assembled, it appears ready for use as shown in FIGS. 1 and 2. The slide rack is protruding slightly through the upper cover opening 18 and the cam rollers 28 on the lower end of the slide rack are forced rearwardly or to the right by the spring 48 up on the upper portion of the cammed side walls 15.

In operating the device, the slide 27 is inserted into the slot 23 in the slide rack 22. The upper end of the slide protrudes above both the rack and the cover 16. The indicating gears are adjusted to register the desired identifying member, in this case, say 654322. The slide and slide rack are then pushed downwardly manually by the operator. The cam rollers on the slide rack follow the downwardly and leftwardly extending cam portion until the lower end of the slide contacts the line of abrasive numerals. At this point, the lower side of the vibrator touches the contact arm 52, switch 50 is closed and electric power is supplied to the vibrator. The end of the slide is then vibrated against the abrasive numerals and the corresponding numerals are abraded thereon as shown in FIG. 6. After a short interval of time, the manual pressure on the slide is released and the vibrator-rack assembly returns to the initial position due to the urging of the spring 48. The marked slide is removed and another inserted.

While in describing the preferred embodiment of this microscope slide marker, reference has been made to a numeral marking or identifying system, it should be understood that any other desired system of marking could be used. Greek characters, letters of the alphabet, or other distinguishing marks could be used just as easily as the numerals shown.

Obviously many modifications and variations of the present invention are possible in the light of the above teachings. It is therefore to be understood that within the scope of the appended claims the invention may be practiced otherwise than as specifically described.

What is claimed is:

1. A microscopic slide marker comprising, in combination:

a base;

a plurality of abrasive marking characters rotatably supported on said base;

means to present a selected group of said characters in a horizontal line;

a cover enveloping said base and said plurality of abrasive marking characters, said cover having substantially vertical sides and back walls, a horizontal top wall and a sloping front wall;

a first opening in the top wall of said cover;

a second opening in the front wall of said cover;

indicating means geared to said first named means for visually indicating the selected characters presented in said horizontal line, said indicating means protruding through said second opening in said cover;

a substantially vertical microscope slide holder positioned substantially internally of said cover for contacting a portion of said slide with said horizontal line of selected abrasive characters, said holder protruding through said first opening in said cover; and low frequency electrical vibrating means pivotally supported by the side walls of said cover for vibrating said portion of said slide in contact with said horizontal line of selected abrasive characters, said vibrating means having a substantially vertically slotted base adapted to slidingly receive said slide holder.

2. A microscopic slide marker as claimed in claim 1 further characterized by said microscopic slide holder being substantially vertically movable in said vibrator base and having means associated with said slide holder and the vertical side walls of said cover for contacting said slide in said slide holder with said abrasive characters when said slide holder is manually pushed downwardly through said first opening in the top wall of said cover.

3. A microscopic slide marker as claimed in claim 2 further characterized by having resilient means for retracting said slide from contact with said line of abrasive characters when the manual pressure on said slide holder is released.

4. A microscopic slide marker as claimed in claim 2 further characterized by having a source of low frequency alternating current electric power, leads connecting said power source to said vibrating means, a normally open switch installed interiorly of said cover in one of said power leads, a contact arm mounted on said switch for mechanically contacting a portion of said vibrating means when said slide holder is manually pushed downward and said vibrating means is rotated about its pivots in said cover whereby said switch is closed and power is supplied to said vibrating means only when said slide is in contact with said line of abrasive characters.

5. A microscopic slide marker as claimed in claim 2 further characterized by said means associated with said slide holder and vertical side walls of said cover for contacting said slide in said slide holder with said abrasive characters when said slide holder is manually pushed downwardly through said first opening in the top wall of said cover comprising a pair of cam rollers fitted to the lower portion of said slide holder and downwardly sloping cammed portions formed interiorly in said vertical side walls, each of said cam rollers extending laterally from the lower portion of said slide holder and coacting with its adjacent cammed portion to force said slide holder toward said abrasive characters as said slide holder is manually pushed downwardly through said first opening and through the vertically slotted base of said vibrating means.

References Cited in the file of this patent

UNITED STATES PATENTS

| | | |
|---|---|---|
| 1,935,194 | Wilsey | Nov. 14, 1933 |
| 2,019,301 | Friden | Oct. 29, 1935 |
| 2,039,600 | Locke | May 5, 1936 |
| 2,326,603 | Barish | Aug. 10, 1943 |
| 2,326,604 | Barish | Aug. 10, 1943 |
| 2,543,910 | Houston | Mar. 6, 1951 |
| 2,704,333 | Calosi et al. | Mar. 15, 1955 |
| 2,842,052 | Coonradt | July 8, 1958 |